3,454,678
ACYLATED BIS(DIPHENYLPHOSPHINO-DITHIOATES)
Silvio L. Giolito, Whitestone, N.Y., assignor to Stauffer Chemical Company, New York, N.Y., a corporation of Delaware
No Drawing. Filed Oct. 23, 1965, Ser. No. 504,243
Int. Cl. C07f 9/30; C08f 45/58
U.S. Cl. 260—926                    3 Claims

ABSTRACT OF THE DISCLOSURE

Acylated diphenylphosphinodithioates useful as ultra-violet stabilizers for poly-alpha-olefins are represented by the formula:

$$R-\underset{R^1}{\underset{|}{\overset{X}{\overset{\|}{P}}}}-S-\overset{O}{\overset{\|}{C}}-R^2$$

wherein R and R$^1$ are hydrocarbon groups which can be substituted such as chlorophenyl, lower alkylated phenyl, lower alkoxy phenyl; X is oxygen or sulfur; and R$^2$ is a radical selected from the formulae:

$$S-\underset{R^1}{\underset{|}{\overset{X}{\overset{\|}{P}}}}-R$$

and $$-(CH_2)_n-\overset{O}{\overset{\|}{C}}-S-\underset{R^1}{\underset{|}{\overset{X}{\overset{\|}{P}}}}-R$$

wherein X, R and R$^1$ are as previously defined and $n$ is an integer of from 1 to 10.

---

This invention relates to organophosphorus esters. More particularly, this invention is concerned with acylated diphenyl-phosphinodithioates which are useful as light (ultra-violet) stabilizers for poly-alpha-olefin compositions.

It is known that plastic and polymeric materials generally undergo degradation in the presence of light and/or heat. Especially sensitive to these agencies are some of the synthetic resins such as polyethylene, polypropylene and the like. In order to increase the life of plastics and polymers, it has become the practice to incorporate therein certain substances, usually referred to as ultra-violet absorbers which are capable of absorbing the incident actinic radiation, thereby protecting the plastic substrate from deterioration.

We have now discovered that certain acylated diphenylphosphinodithioates are effective in protecting poly-alpha-olefins against the deleterious effects of light, and the provision of such compounds constitutes the primary purpose and object of this invention.

Another object of the invention is to provide poly-alpha-olefin compositions stabilized with the above-named compounds.

Other objects will be apparent from the detailed description which follows.

The novel acylated diphenylphosphinodithioates of the invention may be represented by the general formula $$R-\underset{R^1}{\underset{|}{\overset{X}{\overset{\|}{P}}}}-S-\overset{O}{\overset{\|}{C}}-R^2$$

wherein R and R$^1$ are aromatic hydrocarbon groups such as phenyl, naphthyl and the like which may be substituted, such as chlorophenyl, lower alkylated phenyl, lower alkoxy phenyl and the like; X is a chalcogen such as oxygen and sulfur, and R$^2$ is an alkyl of from 1 to 20 carbon atoms, an aromatic hydrocarbon radical such as phenyl, naphthyl and the like which may be chloro substituted, an aralkyl such as benzyl or a radical selected from the formulae consisting of $$-S-\underset{R^1}{\underset{|}{\overset{X}{\overset{\|}{P}}}}-R$$

and $$-(CH_2)_n-\overset{O}{\overset{\|}{C}}-S-\underset{R^1}{\underset{|}{\overset{X}{\overset{\|}{P}}}}-R$$

wherein X, R and R$^1$ are as previously defined, and $n$ is an integer of from 1 to 10.

Specific compounds falling within the ambit of the above formula including the following:

[Structural formulas of specific compounds]

The novel compounds of the invention are prepared by reacting a diarylphosphinodithioate with an acyl chloride in accordance with the following equation:

$$R-\underset{R^1}{\underset{|}{\overset{X}{\overset{\|}{P}}}}-SM + Cl-\overset{O}{\overset{\|}{C}}-R^2 \longrightarrow R-\underset{R^1}{\underset{|}{\overset{X}{\overset{\|}{P}}}}-S-\overset{O}{\overset{\|}{C}}-R^2 + MCl$$

wherein R, R¹, X and R² are as previously defined and M is a metallic cation such as sodium or potassium.

In preparing the new organophosphorous esters of the invention, I have discovered that generally excellent results are achieved by heating the diphenylphosphinodithioate with an acyl halide with or without a solvent and thereby isolating the acylated diphenylphosphinodithioate from the alkali metal chloride byproduct. And especially convenient means for conducting the reaction is to reflux the components in the presence of a relatively inert organic solvent such as the lower ketones which include acetone, methyl ethyl ketone and diethyl ketone. The use of a catalyst is also desirable such as methylamine, diethylamine and pyridine. After removing the alkali metal chloride by-product and distilling off the solvent, the residual acylated diphenylphosphinodithioate may be isolated by employing the usual techniques available to the skilled organic chemist such as crystallization, distillation, sublimation and the like.

The ultra-violet stabilizers contemplated by the invention may be blended or incorporated into the poly-alpha-olefin compositions by any of the conventional methods commonly used for mixing such materials with resins and plastics. For example, milling on heated rolls, deposition from solvents and dry blending are well-known techniques.

In order to prepare poly-alpha-olefin compositions which are resistant to prolonged exposure to sunlight and the elements, it is preferred that the concentration of the novel acylated diphenylphosphinodithioate be maintained in the range of 0.01 to about 5.0% based on the weight of the polymer.

Although the molecular weight of poly-alpha-olefins varies over wide limits, the compounds of the invention are not restricted to any particular molecular weight range. Poly-alpha-olefins ranging in molecular weight from about 15,000 to about 20,000, however, are afforded particularly excellent protection.

The following examples which are illustrative of the invention should not be construed as limiting examples, for variations and modifications thereof will be apparent to one having ordinary skill in this art.

PREPARATION OF THE COMPOUNDS

Example 1.—Benzoyl diphenylphosphinodithioate 27.2 grams (0.1 mole) of sodium diphenylphosphinodithioate were dissolved in 200 milliliters of acetone to which was added slowly 14.0 grams (0.1 mole) of benzoyl chloride. The reaction mixture was then refluxed for two hours during which time a precipitate of sodium chloride separated out. The mixture was filtered to remove the sodium chloride salt and the filtrate distilled at reduced pressure to remove the acetone and other volatile materials. Benzene was next added, the mixture warmed to dissolve the crystals, washed once with dilute sodium hydroxide, filtered, separated, washed once with water, separated, dried over charcoal, and flash evaporated under reduced pressure to remove the benzene. After standing over night, the white crystals which formed were crystallized from a mixture of hexane and benzene to yield a purified benzoyl diphenylphosphinodithioate having an analysis of 17.9% S (calculated 17.9% S) and a melting point of 120–1° C.

Using the procedure of Example 1, the following compounds were synthesized.

Example 2.—Propionyl diphenylphosphinodithioate

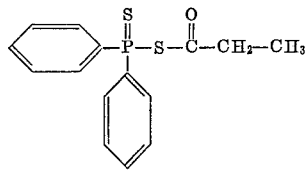

(brown oil; ND24=1.6241)

Example 3.—Acetyl diphenylphosphinodithioate

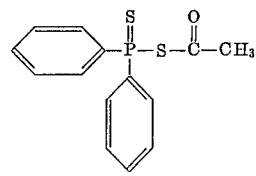

(white crystals; M.P. 86–90° C.)

Example 4.—Keto bis(diphenylphosphinodithioate)

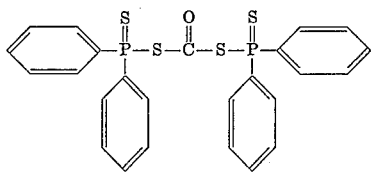

(red oil; ND24=1.6267)

Example 5.—Sebacoylketo bis(diphenylphosphino-dithioate)

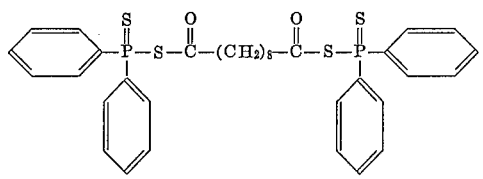

(yellow oil; ND24=1.6376)

Example 6.—Isovaleryl diphenylphosphinodithioate

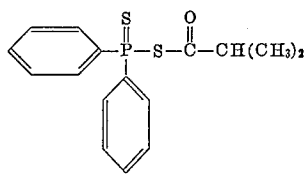

(brown oil; ND24=1.6313)

Example 7.—Lauroyl diphenylphosphinodithioate

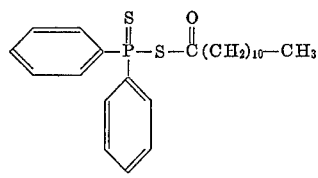

brown oil; ND24=1.5703

Example 8.—Caproyl diphenylphosphinodithioate

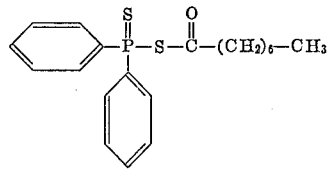

brown oil; ND24=1.5855

Dry blends consisting of 0.5% by weight of each of the compounds of Examples 1–8 and 50 g. of isotactic polypropylene were subjected to compression molding in the usual manner at a temperature of 400° F. for six minutes at 2000 p.s.i. The blended polymer was compression molded or extruded into a 25 mil. sheet and thereafter cut into square samples measuring 2 inches on the side. A like sample containing no stabilizer was also prepared and tested. The samples were then exposed in a Xenon Arc Weatherometer operating at 6000 watts. The water cycle was adjusted whereby each sample was subjected to 18 minutes of water spray and 102 minutes of dry exposure for each two hours of exposure. Exposure damage to the samples of polypropylene was assessed with respect to change of structural strength.

After a period of exposure in excess of 900 hours, the test sheet of polypropylene showed no signs of brittleness to 180° flexure test. Nor was there any evidence at this time of any surface crazing or any coloration or staining. A blank specimen of unstabilized polypropylene which was exposed concurrently with the stabilized product failed the flexure test after 250 to 300 hours exposure time.

The Weatherometer as used in compiling the data and tests described herein is identified as an Atlas 6000 watt Xenon Arc Weatherometer Model 60–W.

The polypropylene resin as used in the above-described example is an unstabilized general purpose, high molecular weight polypropylene of the isotactic or crystalline type. Typically, it has a melt index of 4 at 230° C. and a specific gravity of 0.905.

I claim:
1. An acylated diphenylphosphinodithioate of the formula

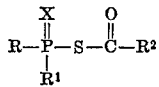

wherein R and $R^1$ are each selected from the group consisting of phenyl, chloro-substituted phenyl, naphthyl, lower alkylated phenyl and lower alkoxy phenyl; X is a chalcogen selected from the group consisting of oxygen and sulfur; and $R^2$ is a radical selected from the formulae:

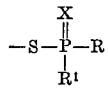

and

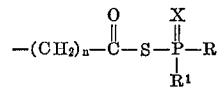

wherein X, R and $R^1$ are as previously defined and $n$ is an integer of from 1 to 10.
2. Keto bis(disphenylphosphinodithioate).
3. Sebacoyl keto bis(diphenylphosphinodithioate).

References Cited
UNITED STATES PATENTS 2,434,357   1/1948   Fischer.
2,786,009   3/1957   Pianfetti et al.
2,545,158   3/1951   McDermott _____ 260—935 XR CHARLES B. PARKER, *Primary Examiner.*

A. H. SUTTO, *Assistant Examiner.*

U.S. Cl. X.R.
260—45.95, 935, 988

PO-1050
(5/69)

UNITED STATES PATENT OFFICE
CERTIFICATE OF CORRECTION

Patent No. 3,454,678      Dated July 8, 1969

Inventor(s) Silvio L. Giolito

It is certified that error appears in the above-identified patent and that said Letters Patent are hereby corrected as shown below:

In the specification, Column 1, line 41, "phenyl-phosphinodithioates" should read -- phenylphosphinodithioates Column 2, line 55 that portion of the formula reading

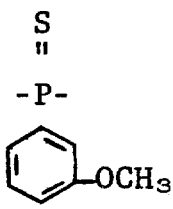   should read   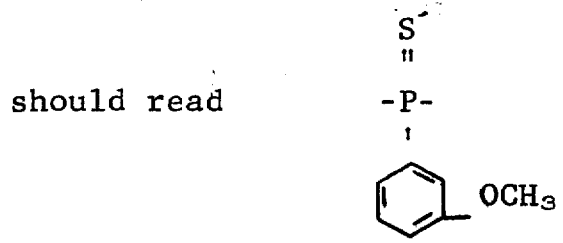

Column 4, line 52, "brown oil; ND24=1.5703" should appear as -- (brown oil; ND24=1.5703)--;

Column 4, line 62, "brown oil; ND24=1.5855" should appear as --(brown oil; ND24=1.5855)--.

In the Claims, Column 6, line 14, cancel "bis(disphenylphosphdithioate" and insert -- bis(diphenylphosphinodithioate)--.

SIGNED AND
SEALED
MAY 5 1970

(SEAL)
Attest:

Edward M. Fletcher, Jr.
Attesting Officer

WILLIAM E. SCHUYLER, JR.
Commissioner of Patents